United States Patent Office 3,198,824
Patented Aug. 3, 1965

3,198,824
ASYMMETRICAL CARBONATE ESTERS OF 2,4-DINITRO-6-LOWER ALKYL PHENOL AND PHENOL OR PHENOLS SUBSTITUTED BY CHLORINE, NITRO OR LOWER ALKYL
Krijn van den Boogaart, Vlaardingen, Netherlands, assignor to Fabriek van Chemische Producten Vondelingenplaat N.V., Schiedam, Netherlands, a Dutch corporation
No Drawing. Filed Mar. 21, 1961, Ser. No. 97,170
Claims priority, application Great Britain, Mar. 21, 1960, 9,984/60
12 Claims. (Cl. 260—463)

The invention relates to novel asymmetrical aryl carbonates having the formula

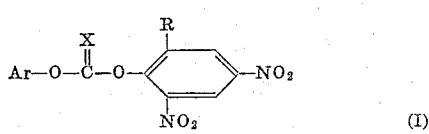

wherein X is selected from the group consisting of oxygen and sulfur, R is selected from the group consisting of alkyl radical and alkenyl radicals having 1 to 16 carbon atoms and Ar is selected from the group consisting of phenyl and naphthyl radicals which may be substituted with members selected from the group consisting of halogens, nitro groups, sulfonamide group, sulfonic acid groups and carboxylic acid groups. The invention further relates to novel herbicidal and fungicidal compositions comprised of compounds of formula I and a novel method of combatting plants and fungus.

Bis(4-nitro-phenyl) carbonate and bis(2-chloro-4-nitrophenyl) carbonate are known to be effective fungicides against mildew on leather, but these compounds have no herbicidal activity. Alkyl pentachlorophenyl carbonates are known to be herbicides, but the alkyl portion is replaced with an aryl group, the resulting compounds have no herbicidal or fungicidal activity. Surprisingly, applicant has found that the compounds of Formula I are effective herbicides and fungicides.

It is an object of the invention to provide novel asymmetrical carbonates of Formula I.

It is another object of the invention to provide novel herbicidal and fungicidal compositions comprised of compounds of Formula I.

It is a further object of the invention to provide a novel method of combatting plants and fungus.

These and other objects and advantages of the invention will be obvious from the following detailed description.

The novel asymmetrical aryl carbonates of the invention have the following formula

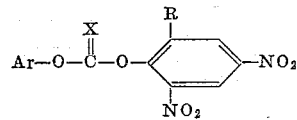

wherein R is selected from the group consisting of alkyl and alkenyl radicals having from 1 to 16 carbon atoms, X is selected from the group consisting of oxygen and sulfur and Ar is selected from the group consisting of phenyl and naphthyl radicals which may be substituted with a member selected from the group consisting of halogens, nitro groups, sulfonamide groups, sulfonic acid groups and carboxylic acid groups. The sulfonic acid and carboxylic acid groups may be present in the form of their salts or esters. However, Ar does not represent the radial, 6-R-2,4-dinitro-phenyl, as the compound would not be asymmetrical.

A preferred group of the novel asymmetrical compounds of the invention are compounds having the formula

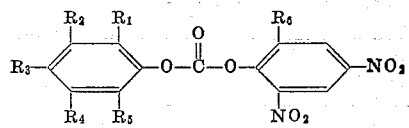

wherein $R_6$ is a lower alkyl radical and $R_1$, $R_2$, $R_3$, $R_4$, and $R_5$ are selected from the group consisting of hydrogen, halogen, nitro group and lower alkyl radical.

The novel asymmetrical aryl carbonate compounds of this invention are produced by reacting phosgene with 2,4-dinitro-6-R-phenol to form 2,4-dinitro-6-R-phenyl chloroformate where R has the above definition, reacting said chloroformate with ArOH to form asymmetrical carbonates of Formula I where X is oxygen and recovering said carbonate. Thiophosgene may be used instead of phosgene and carbonates of Formula I where X is sulfur will be obtained.

Another method of producing compounds of Formula I is to react phosgene or thiophosgene with a compound ArOH and react the reaction product with 2,4-dinitro-6-R-phenol to form carbonates of Formula I and recovering said carbonates.

The novel method of combatting fungus and plants comprising contacting the fungus and/or plants with an asymmetrical aryl carbonate of Formula I.

The novel fungicidal and herbicidal compositions are comprised of an asymmetrical aryl carbonate of Formula I and an inert carrier. The inert carrier may be solid or liquid. Other wetting, peptizing, dispersing or emulsifying agents may be added to the composition. Suitable examples of some of these additives are calcium lignosulfonate, calcium dinapthyl methane sulfonate, poly-ethoxy ethers of fatty alcohols and ethylene oxide, colloidal cellulose substitution products, polyvinyl alcohol, clay, natural silicates and other usual additives.

In the following examples there are described several preferred embodiments to illustrate the invention. However, it should be understood that the invention is not intended to be limited to the specific embodiments.

EXAMPLE I

*Preparation of 2,4-dinitro-6-methyl-phenyl 2',4'-dinitro-6'-chloro-phenyl carbonate*

In a three-necked flask provided with a stirrer, thermometer and gas inlet tube, 200 grams of 98% 2,4-dinitro-6-methyl-phenol (1 mol.) as flakes were mixed with about 250 ml. of toluene. Through the gas inlet tube 110 grams of phosgene (10% excess) were introduced into the reaction mixture at a temperature of 5–10° C. Subsequently, 121 grams of dimethyl aniline (1 mol) were added in 45 minutes at temperature of 10–15° C. The resulting suspension was stirred at room temperature for 16 hours and thereafter filtered. The precipitate (predominantly the hydrochloric salt of dimethyl aniline) was washed with toluene. Dry air was passed through the filtrate in order to remove traces of phosgene and the volume of the filtrate was increased to 500 ml. by the addition of toluene.

250 ml. of the resulting solution of 2,4-dinitro-6-methyl-phenyl chloroformate in toluene were brought into a three-necked flask having a content of 0.5 liter. At a temperature of 10–20° C. 109 grams of 2,4-dinitro-6-chloro-phenol (0.5 mol) were added, whereafter 61 grams of dimethylaniline (0.5 mol) were added dropwise in 30 minutes. The resulting suspension was stirred for 1 hour and then 100 ml. of water were added while stirring. The mixture was filtered and the precipitate was dried in vacuo at 40° C. Yield 205 grams (93%). Melting point 115–120° C.

In the same way compounds corresponding to the above mentioned Formula I wherein R=CH₃, X is an oxygen atom and Ar represents the radicals listed in Table I have been prepared. The melting points indicated in Table I are the melting points of the compounds wherein Ar represents the radical mentioned.

*Table I*

| Ar | Melting point, °C. |
|---|---|
| (1) phenyl | 126–128 |
| (2) 4-chloro phenyl | 146–147 |
| (3) 4-nitro phenyl | 132–137 |
| (4) 2-nitro phenyl | 137–139 |
| (5) pentachloro phenyl | 194–196 |
| (6) 2-chloro 4-nitro phenyl | 165–168 |
| (7) 2-nito 4-chloro phenyl | 146–155 |
| (8) 2, 4-dinitro phenyl | 140–147 |
| (9) 4-chloro 2, 6-dinitro phenyl | 205–206 |
| (10) 4-methyl 2, 6-dinitrophenyl | 200–202 |

EXAMPLE II

A number of the compounds of Example I were tested in phytocidal tests in comparison with pentachlorophenol. The compounds were sprayed upon tomato plants of 15 cm. height in concentrations of 1, 0.5, 0.25, 0.125, 0.063 and 0.032% of active compound. The results obtained after 6 days are summarized in Table II wherein xxx is total killing, xx=heavy damage, x=light damage and 0=no damage. The compounds tested correspond to the above mentioned Formula I where X=oxygen, R=a methyl group and Ar represents a group as listed in Table II.

*Table II*

| Ar | Concentration in Percent | | | | | |
|---|---|---|---|---|---|---|
| | 1 | 0.5 | 0.25 | 0.125 | 0.063 | 0.032 |
| 4-nitro phenyl | xxx | xxx | xx | xx | 0 | 0 |
| 2-nitro phenyl | xxx | xxx | x | 0 | 0 | 0 |
| 2-chloro 4-nitro phenyl | xx | xx | x | 0 | 0 | 0 |
| 2-nitro 4-chloro phenyl | xxx | xxx | xx | x | 0 | 0 |
| 2, 4-dinitro phenyl | xxx | xxx | xxx | xxx | xx | xx |
| 2, 4-dinitro-6-chloro-phenyl | xxx | xxx | xxx | xxx | xx | x |
| Penta chloro phenol | xxx | xxx | xxx | xxx | xx | 0 |

EXAMPLE III

The compound according to the abovementioned general formula, wherein X=an oxygen atom, R= a secondary butyl group and Ar=2,4-dinitro phenyl and which is an oil, was compared with the well-known compound 2,4-dinitro-6-sec.butyl-phenol (DNBP) in phytocidal tests with tomato plants of 10–15 cm. height in concentrations of 0.063, 0.032, 0.015, 0.008 and 0.004% of active compound. The results of the tests obtained 7 days after spraying are summarized in Table III.

*Table III*

| | Concentration in Percent | | | | |
|---|---|---|---|---|---|
| | 0.063 | 0.032 | 0.015 | 0.008 | 0.004 |
| 2,4-dinitro-6-sec. butyl-phenyl 2,4-dinitro-phenyl carbonate | xxx | xxx | xxx | xxx | xxx |
| DNBP | xxx | xxx | xxx | xxx | xxx |

EXAMPLE IV

The fungicidal action of the compounds was tested in spore germination tests with *Fusarium culmorum* using cherry juice as a stimulant. The results are summarized in Table IV.

*Table IV*

| Compound: | LD₅₀ |
|---|---|
| 2,4-dinitro-6-methyl-phenyl 4′-nitro-phenyl carbonate | 29 |
| 2,4-dinitro-6-sec. butyl phenyl 2′,4′-dinitro-phenyl carbonate | 96 |

Various modifications of the methods and compositions and compounds of the invention may be made without departing from the spirit or scope thereof and it is to be understood that the invention be limited only as defined in the appended claims.

I claim:

1. An asymmetrical bisaryl carbonate having the formula

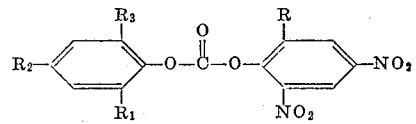

wherein $R_1$, $R_2$ and $R_3$ are selected from the group consisting of hydrogen, lower alkyl, chlorine and nitro groups and R is lower alkyl.

2. 2,4 - dinitro-6-methyl-phenyl 2′,4′-dinitro-6′-chlorophenyl carbonate.

3. 2,4-dinitro-6-methyl-phenyl phenyl carbonate.

4. 2,4-dinitro-6-methyl-phenyl 4′-chloro-phenyl carbonate.

5. 2,4-dinitro-6-methyl-phenyl 4′-nitro-phenyl carbonate.

6. 2,4-dinitro-6-methyl-phenyl 2′-nitro-phenyl carbonate.

7. 2,4-dinitro-6-methyl-phenyl 2′-chloro-4′-nitro-phenyl carbonate.

8. 2,4-dinitro-6-methyl-phenyl 2′nitro-4′-chloro-phenyl carbonate.

9. 2,4-dinitro-6-methyl-phenyl 2′,4′-dinitro-phenyl carbonate.

10. 2,4-dinitro-6-methyl-phenyl 2′,6′-dinitro-4′-chlorophenyl carbonate.

11. 2,4-dinitro-6-methyl-phenyl 2′,6′-dinitro-4′-methylphenyl carbonate.

12. 2,4-dinitro-6-sec. butyl-phenyl 2′,4′-dinitro-phenyl carbonate.

References Cited by the Examiner

UNITED STATES PATENTS

| 2,705,195 | 3/55 | Cupery et al. | 71—2.6 |
| 2,709,648 | 5/55 | Ryker et al. | 71—2.6 |
| 2,758,051 | 8/56 | Smith et al. | 167—30 |
| 2,844,506 | 7/58 | Jenkins | 167—30 |
| 2,917,534 | 12/59 | Sims et al. | 260—463 |
| 2,933,383 | 4/60 | Lambrech | 71—2.6 |
| 2,983,749 | 5/61 | Shepard | 260—463 |
| 3,017,424 | 1/62 | Meyer et al. | 260—463 |

OTHER REFERENCES

Beilstein: "Handbuch der Organishen Chemie," vol. 6, page 256 (1923).

Craft: Science, vol. 101, pages 417–418 (1945).

Hoeflake: Rec. Trav. Chim. 40, 488–490 (1921).

Kinugawa et al.: J. Pharm. Soc., Japan, vol. 79, pp. 933–937 (1959).

CHARLES B. PARKER, *Primary Examiner.*